July 14, 1936.   F. H. ANDERSON ET AL   2,047,454
LOCKER TYPE CABINET
Filed Jan. 25, 1935   3 Sheets-Sheet 1

Inventors
F. H. Anderson
A. E. King
Arthur H. Sturges   Attorney

July 14, 1936.  F. H. ANDERSON ET AL  2,047,454
LOCKER TYPE CABINET
Filed Jan. 25, 1935   3 Sheets-Sheet 2
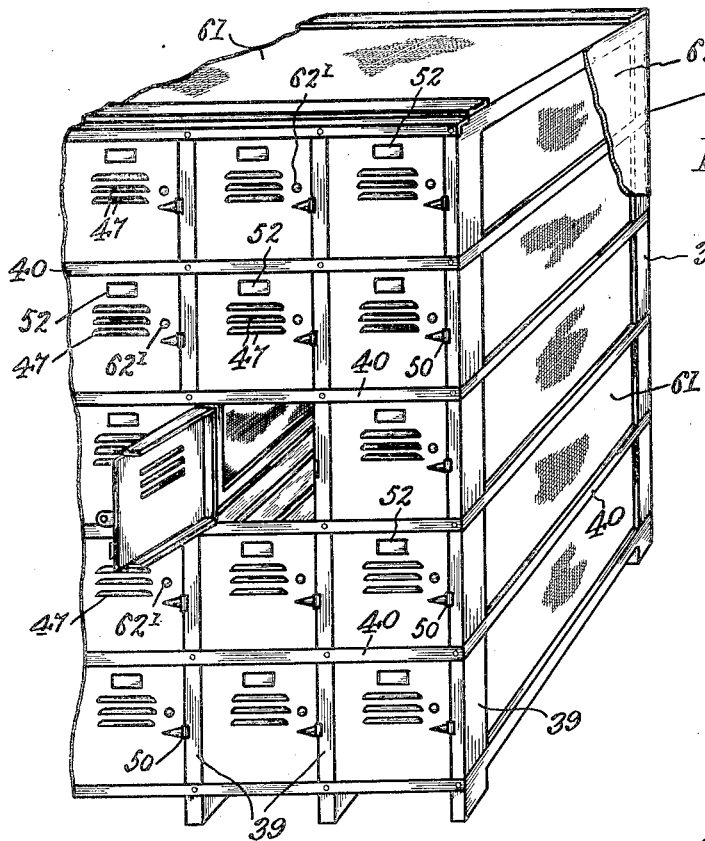
Fig. 3.
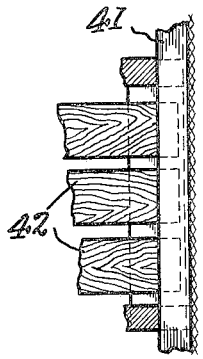
Fig. 10.
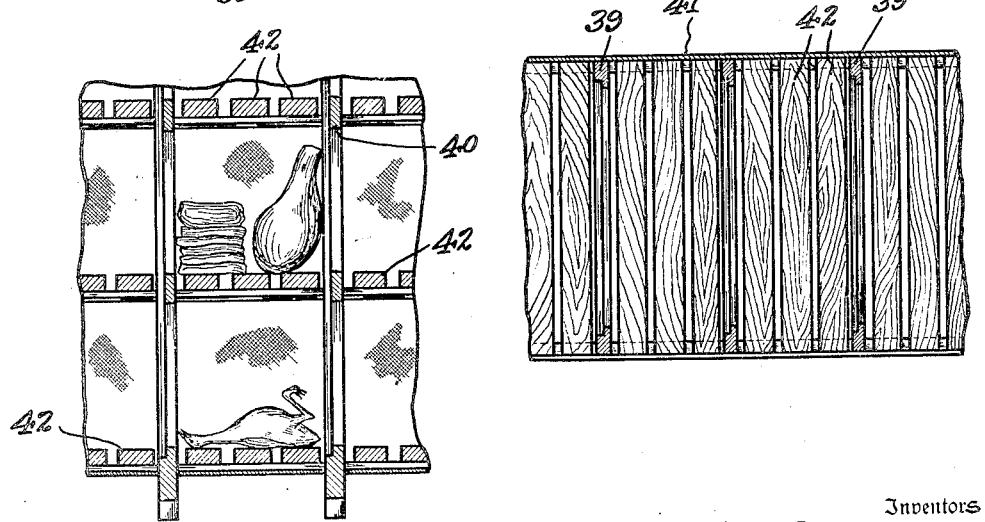
Fig. 4.
Fig. 5.
Inventors
F. H. Anderson
A. E. King
Arthur H. Sturges Attorney July 14, 1936.    F. H. ANDERSON ET AL    2,047,454
LOCKER TYPE CABINET
Filed Jan. 25, 1935    3 Sheets-Sheet 3

Inventors
F. H. Anderson
A. E. King
By Arthur H. Sturges    Attorney

Patented July 14, 1936

2,047,454

UNITED STATES PATENT OFFICE 2,047,454

LOCKER TYPE CABINET

Frank H. Anderson and Arthur E. King,
Omaha, Nebr.

Application January 25, 1935, Serial No. 3,512

4 Claims. (Cl. 312—106)

The present invention relates to an improved method and means for preserving perishables, such as meats and the like, and has for an object to provide an apparatus for storing edibles of individual owners so that they may have access thereto while at the same time unauthorized persons are prevented from tampering with the stored goods.

Another object of the invention is to provide a method and means wherein hogs, cattle, poultry, sheep and the like may be butchered during any selected season of the year and stored for later consumption by the individual owners thereof.

Another object of the invention is to process and store the meats or the like for use and by eliminating the middleman's profit and handling charge, and wherein the raiser and owner of live stock may slaughter, process and store the same himself in an accessible location closely adjacent to the source or origin of the commodities.

The invention also aims at the provision of an improved storage locker structure of the knockdown type but wherein the lockers are not accessible to an adjacent open locker but wherein it is necessary for the removal of partition walls and the like to have adjacent lockers open for the withdrawal of fastening devices and the like.

A still further object of the invention is to provide a construction by means of which a system of checking and identification may be employed in the use of the individual lockers in the storage compartment.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a detail perspective view of a bank of lockers.

Figure 4 is a detail fragmentary section taken through the bottom portion of one of the lockers on the line 4—4 of Figure 8.

Figure 5 is a fragmentary transverse section taken through a plurality of adjacent lockers, showing the relation therebetween.

Figure 10 is a fragmentary horizontal section taken through the rear portion of a locker on the line 10—10 of Figure 8.

Figure 1:
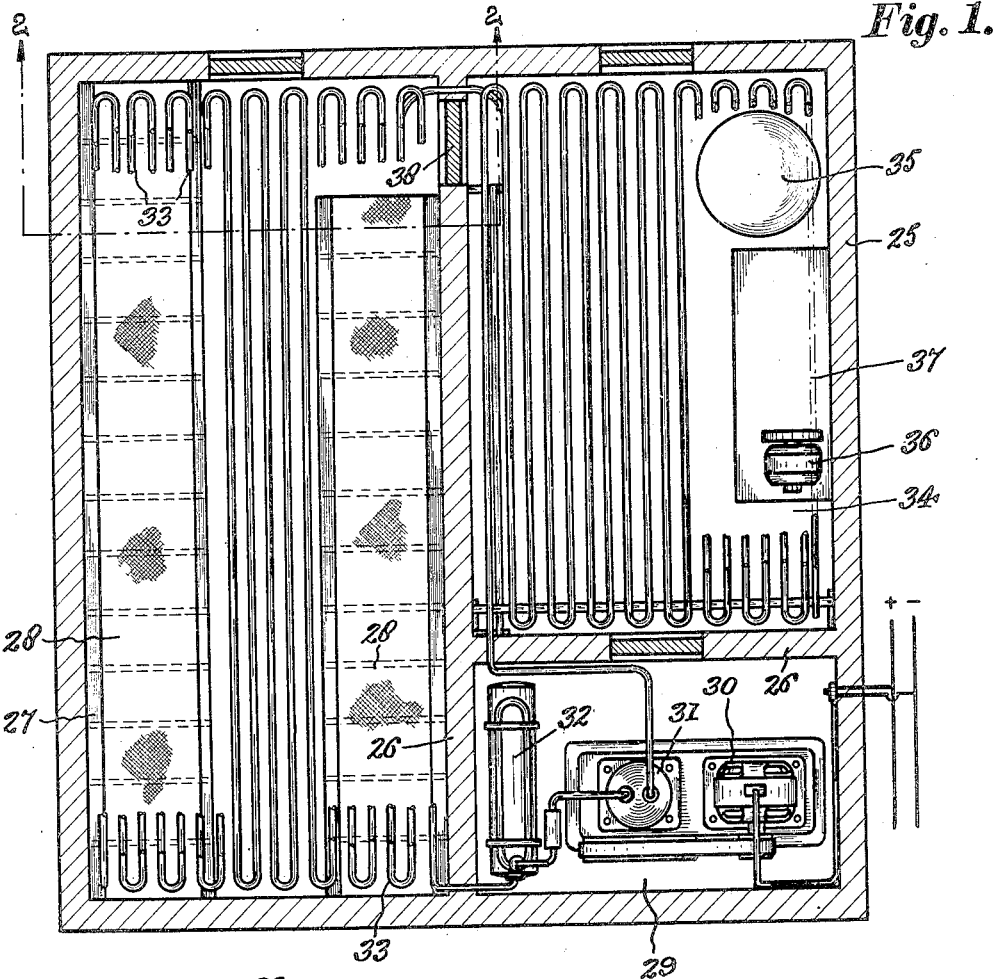
Figure 1 is a top plan view with the roof removed of a storage compartment constructed according to the present invention.

Referring now to the drawings, and first to Figure 1, the storage room or building comprises an outer wall 25 which is divided by partitions 26 into a desired number of compartments or chambers. In the arrangement shown the building is provided along one side with a relatively long and wide chamber 27 providing a locker storage compartment in which are disposed in spaced longitudinal rows, banks 28 of lockers with an aisle therebetween for admitting easy and quick access to the individual lockers. The building 25 is also provided with an engine or machinery room 29 in which is disposed suitable apparatus for operating the cooling and storage plant.

Figure 2:
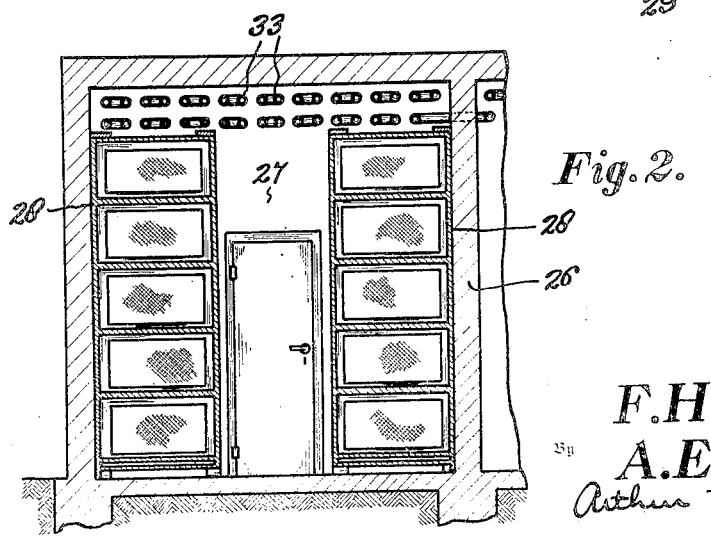
Figure 2 is a fragmentary vertical section taken through one end portion thereof on the line 2—2 of Figure 1.

As shown a motor 30 is disposed in the chamber 29 and connected to a compressor 31 which is in circuit with a tank 32 adapted to contain a body of refrigerant, and the tank 32 is connected or branched into cooling coils 33 which extend lengthwise of the various compartments and which are preferably disposed in the upper portions thereof, as shown in Figure 2.

In one portion of the building 25 is disposed a processing room or compartment 34 in which the pipe coils 33 are also disposed, and which is provided with various devices useful in preparing the meat and the like for the lockers. In the present instance the compartment 34 is provided with a butcher's block 35, a meat grinder 36, and a pre-cooling bench 37. It will be noted that the partition 26 which defines one side of the compartment 27, is provided near one end with a door 38 which establishes communication, when open, between the processing compartment 34 and the storage compartment 27. One of the banks of lockers 28 terminate adjacent the door 38 and in spaced relation to the adjacent end of the compartment 27 so as to provide a suitable aisle or passageway between the processing compartment 34 and the storage compartment 27. This admits of the direct transfer of the perishable commodities from the processing room into the lockers. The low temperature of the meats or the like when processed may thus be maintained as the meats are not removed from the building 25 during their processing, handling and storage in the lockers.

The banks 28 of lockers are preferably of the knock-down type so that the units thereof may be manufactured at a plant and shipped to the location of the storage building 25 and there erected according to the arrangement, lengths and the like of the banks of lockers required.

Each bank of lockers 28 has a plurality of spaced apart studs or uprights 39 which are preferably of angle iron construction and which are preferably detachably connected to horizontal bars 40 also of angle iron construction and which are cut away or recessed so as to interfit with the uprights 39 and form therewith a skeleton frame with horizontal webs or ledges to support the bottoms of the various lockers which are constructed within the frame.

Figure 8:
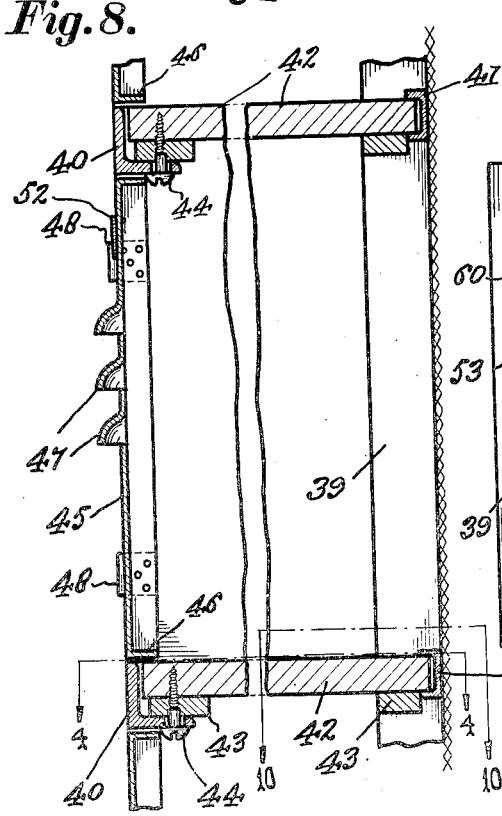
Figure 8 is a detail sectional view, partly broken away, taken vertically through a locker on the line 8—8 of Figure 6.
Figure 9:
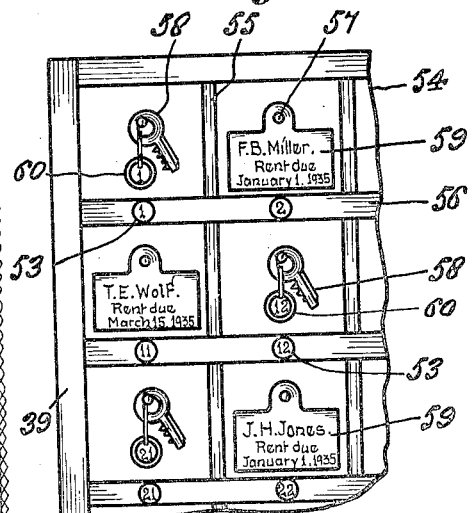
Figure 9 is a fragmentary face view of an indicator board to be used with the bank of lockers.

As shown to advantage in Figures 5 and 8, the rear uprights 39 are provided at intervals throughout their heights with cross channels 41 which substantially register with the forward horizontal bars 40 and which receive therein the rear edge portions of bottoms 42 for the individual lockers, and the bottoms 42 provide top walls for the subjacent lockers.

As the rear ends of the bottoms 42 fit in the channel bars 41 they cannot be raised or lowered at their rear ends but must be introduced into the channel irons or rails 41 by an upward swinging movement of the forward ends of the bottoms 42.

As shown to advantage in Figures 4, 5, and 10, each bottom 42 is composed of a plurality of slats suitably spaced apart and preferably constructed of wood preheated by dipping in boiled oil for impregnating the wood with the oil so that at suitable intervals the slat bottoms 42 may be removed, sterilized and cleaned. The wood is selected particularly as frozen meats disposed in the lockers may not adhere readily thereto as in the case of iron or like metal. These slats extend lengthwise of the lockers and are secured in units to provide the bottoms 42 by transverse strips 43 arranged at or adjacent to the opposite ends of the slats as shown to advantage in Figure 8. It is preferable that the rear ends of the slats extend slightly beyond the adjacent strip 43 so that the ends of the slat may fit with a desired degree of tightness in the channel rails or irons 41. The channel rails or irons 41 are offset upwardly from the horizontal plane of the ledges of the front angle irons 40 a distance equal substantially to the thickness of the forward strips 43 so that the strips may rest upon the channel rail and receive therethrough retaining screws 44 or the like which are passed upwardly through the ledges of the angle irons 40 from the subjacent locker. Thus, when the locker is opened the bottom 42 cannot be lifted as the fastening device or screw 44 holds the forward end of the bottom to the adjacent angle iron 40 and access cannot be had to the subjacent locker from an upper locker.

Each locker is provided with a door 45 preferably of sheet metal and each fits into the forward end of the locker between the adjacent uprights 39 and the horizontal angle bars or rails 40. The door 45 is preferably of sheet metal and is provided with an inwardly extending marginal flange 46 of sufficient depth to overlie the forward edge of the bottom 42 of the locker so that when the door 45 of an upper locker is closed, the bottom 42 of the upper locker cannot be raised from the adjacent ledge when the subjacent locker is opened.

In this manner, the lockers are interlocked against access to adjacent lockers when one locker is opened. At the same time, when it is desired to remove the bottoms 42 for sterilizing and cleansing it is only necessary to open the doors 45 of one tier of lockers so that the screws 44 may be removed through the lower lockers and the bottoms 42 may then be raised at their forward ends and drawn forwardly out of the upper lockers. It will be noted from Figures 3 and 5 that the uprights 39 project a desired distance below the bottoms of the lower lockers so as not only to provide a clearance space facilitating cleansing of the floor beneath the bank of lockers and also the free circulation of air beneath and about the lockers, but also to admit of the removal of the lower retaining screws or devices 44 to admit removal of the lowermost bottoms 42.

Figure 6:
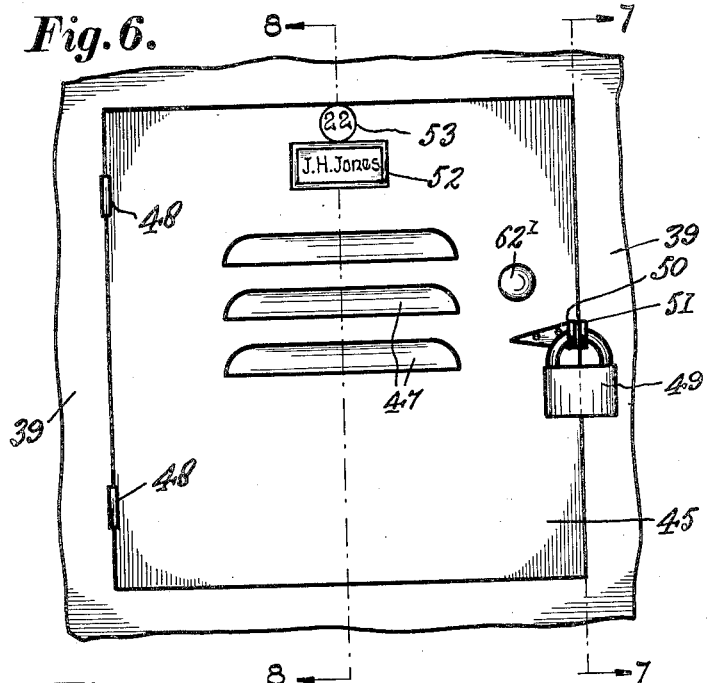
Figure 6 is a detail outer end view of one of the lockers, showing the door closed and locked.
Figure 7:
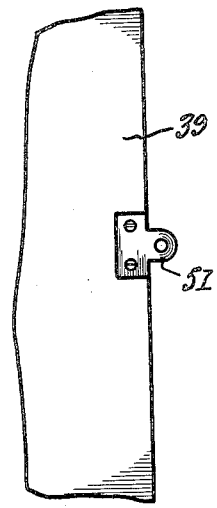
Figure 7 is a fragmentary elevation of one side of the locker showing a hasp eye mounted thereon.

Each door 45 is also provided with a plurality of louvres 47 which are directed downwardly so that inspection of the interior of the lockers cannot be had without opening the door, and so that the air circulating about the bank of lockers may freely circulate through the lockers and about the commodities placed therein. The doors 45 may, as shown in Figures 6 and 7, be mounted upon hinges 48 disposed at one side of the locker and secured to the inner faces of the flange 46 of the door and the adjacent upright 39. The opposite edge portion of the door fits against the opposite upright 39 and may be locked thereto by a padlock 49 engaging through the hasp eyes 50 and 51 secured respectively upon the door 45 and the adjacent upright 39 which provides a frame structure for the door. In order to facilitate the use of the lockers, each door 45 may be provided with a tag frame 52 secured to a suitable portion of the door, and the door may also be provided with a distinguishing number 53. The tag frame 52 is adapted to receive a tag therein with the name of the person renting the locker as shown in Figure 6. The operator or keeper of the storage building 25 may be provided with an indicator board 54 which is provided across its face with vertical straps 55 and horizontal straps 56 simulating the arrangement of the lockers in the banks 28. The indicator board 54 is thus divided on its face into a plurality of spaces corresponding in number and arrangement to the doors 45 of the lockers, and each space is provided with a corresponding number or designation 53 to that on the corresponding doors 45.

The indicator board 55 is provided in each space with a suspension pin 57 adapted to alternately receive thereon a locker key 58 and a tag 59. The tags 59 bear the names corresponding to the names in the tag frames 52 on the locker doors 45. The keys 58 of course are provided with number discs 60 or the like which correspond to the various padlocks 49 of the doors 45.

In use, when a person rents one of the lockers a key 58 is delivered to him for controlling the entrance and locking of the particular locker rented and the renter's name is placed on a tag 59 and also on the tag in the frame 52 of the locker door. By inspecting the indicating board it may thus be readily ascertained which lockers are rented by noting the suspension of the tags 59 in lieu of the respective keys 58 and each tag 59 may be provided with any other suitable data desired such as a rent due date or the like so that the operator or keeper of the processing and storage plant may readily keep a check on the individual lockers and renters.

The top, side and back walls of the lockers may all be closed in by a suitable sheet material as shown at 61 and which may be what is known as hardwear cloth with a quarter inch mesh, for example, so that substantially sixty percent of the area of the enclosing surfaces will be open to admit free circulation of air through the lockers.

As shown fragmentarily in Figure 3, the ends of the banks 28 of the lockers may be closed in by imperforate walls 62 of sheet metal or the like so as to protect the end lockers against damage or breakage. The doors 45 may each be provided with a knob or handle 63 to facilitate the opening and closing of the doors.

In the operation of the indicator board 54, the operator or keeper of the storage and processing plant may inspect the various tags 59 on the indicator board and prepare notification slips from time to time according to the rent due information carried by the tags 59. The slips may be inserted in the respective lockers, and it of course is preferable that the keeper or operator in charge will have a master key by means of which he may gain access to the individual lockers so as to maintain the same in a sanitary and clean condition when necessary. These notification rent slips may be placed in the lockers preferably ten days in advance of the due days as noticed on the tags 59 and the due date may thus be changed upon the tags 59 in any convenient manner or new tags may be substituted therefor.

In operation a solicitor contacts the raiser of meat or the like and forms a contract with him, whereby a locker or number of lockers is rented to him.

The animals or fowls are preferably slaughtered or roughly butchered upon the farm of a raiser thereof, the guts, entrails and by-products remaining with the owner and the meats or the like having food value are brought to the plant where a custom butcher operating in the processing room 34 subdivides the meat carcasses and the like to suit the customer's order and to a size which may be conveniently stored in a locker or a number of the latter before the carcasses are subdivided into roasts and the like, the meat is permitted to age in the room 34 whereby the animal heat is properly withdrawn therefrom.

Among other advantages of the operation of the invention it will be noted that the said slaughtering may be done at any season of the year whereby the owner of the meat may have fresh killed meats the year round.

It will be understood that as heretofore practiced in the art the farmers generally do all of their killing during the winter months on account of weather conditions. This invention allows them to butcher the year round at any time of the season.

The method or process of this invention involves the preparation or processing of the meat or the like in a processing compartment or room 34 located in a single building which may be suitably cooled and maintained throughout at a desired low temperature.

From the room 34 the processed meat is carried directly into the storage room or compartment 27 without leaving the building and without subjecting the meat or the like to a harmful or injurious change in temperature. The invention embodies the direct storage of the processed meat or the like in the lockers of the storage room 27 without effecting a rise in the temperature to which the processed edibles are subjected. This storage and processing plant or building is preferably located at a suitable point of distribution of the meats or commodities which are stored in the lockers and, as the lockers are individual with respect to the farmers or raisers of live stock, these farmers or raisers of live stock may bring their products to the processing room 34 and personally process or treat the same and place them in their own lockers.

We do not wish to be restricted to the size, form, and proportions of the various parts, and obviously changes could be made in the construction herein described without departing from the spirit of the invention, it being only necessary that such changes fall within the scope of the appended claims.—

What is claimed is:—

1. A storage device for edibles and the like comprising a bank of lockers composed of spaced apart uprights and horizontal angle irons secured across the uprights in spaced relation to provide compartments therebetween, channel irons secured across the uprights at the inner ends of the compartments, a door for each compartment, a bottom for each compartment adapted to engage at its rear end in an adjacent channel iron and adapted to seat at its outer end on the ledge of an adjacent horizontal angle iron, fastening devices extending upwardly through the ledges into the forward portions of the bottoms to hold the latter to the ledges, and means carried on the door of each compartment projecting inwardly from the door and overhanging the forward portion of the bottom to hold the same to the ledge.

2. In a storage device, a bank of lockers having spaced apart uprights, horizontally disposed angle irons secured across the uprights in vertically spaced apart relation to define compartments therebetween and having horizontal flanges forming ledges in the forward ends of the compartments, channel rails secured across the inner sides of the upright at the inner ends of the compartments, slatted bottoms engaging at their inner ends in said channel rails to hold the inner ends of the bottoms from vertical displacement, the forward ends of said bottoms adapted to rest on the ledges of the forward angle irons, fastening devices extending upwardly through the ledges into the forward portions of the bottoms to hold the latter to the ledges, and a door for each compartment provided with an inwardly extending flange adapted to overhang the forward end of the bottom and maintain the same against said ledge when said fastening devices are removed.

3. A locker structure comprising spaced apart uprights, horizontal rails secured across the uprights in vertically spaced apart relation to provide tiers of lockers, wall sections disposed between said horizontal rails and the uprights for closing in the walls of the lockers, a door for each locker having an inwardly extending flange, the rails at the forward end of the lockers having inwardly projecting ledges spaced below the door flanges, channel rails secured across the inner sides of the rear uprights in line with said ledges and door flanges, removable bottoms fitting at their rear ends in said channel rails and at their forward ends between the ledges and the door flanges, and locking means operable at the lower sides of said ledges and engaging the bottoms for holding the same from removal from the ledges when the doors are open.

4. A locker comprising corner uprights, angle irons secured across the forward uprights and having horizontal ledges extending inwardly therefrom, a horizontal channel rail secured across the rear uprights and facing toward said ledges, slatted partitions disposed in the upper and lower portions of the locker and engaging at their rear edges in the respective channel rails and seated at their forward ends on said ledges, fastening devices extending upwardly through the ledges and into the forward ends of the slatted partitions for holding the latter to the ledges, and a door disposed between the forward uprights and the upper and lower angle bars and provided with an inwardly extending flange overhanging the lower ledge when the door is closed for overlapping engagement with the lower slatted partition to prevent lifting thereof from the ledge when the adjacent fastening device is removed.

FRANK H. ANDERSON.
ARTHUR E. KING.